(12) United States Patent
Hsien

(10) Patent No.: US 6,772,645 B2
(45) Date of Patent: Aug. 10, 2004

(54) TORQUE TEST DEVICE

(76) Inventor: Chih-Ching Hsien, No. 367, Pei Yang Rd., Feng Yuan, Taichung (TW)

( * ) Notice: Subject to any disclaimer, the term of this patent is extended or adjusted under 35 U.S.C. 154(b) by 0 days.

(21) Appl. No.: 10/298,518

(22) Filed: Nov. 19, 2002

(65) Prior Publication Data

US 2004/0093959 A1 May 20, 2004

(51) Int. Cl.[7] ................................. G01L 3/02
(52) U.S. Cl. ................................. 73/862.191
(58) Field of Search ............... 82/153; 251/61.4; 409/218; 73/81, 862.191, 141; 33/833, 508; 368/278; 81/478; 101/35

(56) References Cited

U.S. PATENT DOCUMENTS

| | | | | |
|---|---|---|---|---|
| 3,848,463 A | * | 11/1974 | Hejzlar et al. | 73/141 AB |
| 4,382,687 A | * | 5/1983 | Lemelson | 368/278 |
| 5,265,325 A | * | 11/1993 | Fortin | 29/752 |
| 6,000,329 A | * | 12/1999 | Averill | 101/35 |
| 6,109,150 A | * | 8/2000 | Saccomanno, III | 81/478 |
| 6,430,829 B1 | * | 8/2002 | Williamson et al. | 33/508 |

* cited by examiner

*Primary Examiner*—Edward Lefkowitz
*Assistant Examiner*—Octavia Davis

(57) ABSTRACT

A torque test device includes a body in which a rotatable member is received and an engaging end on an end of the rotatable member extends out from the body. A rod and a pushing member respectively extend from a periphery of the rotatable member. A gauge is located on a top of the body and an activation bar extends from the gauge and inserts into the body. The activation bar contacts the pushing member. A spring has an end contacting an inside of the body and the other end of the spring contacts the rod. A wrench is engaged with the engaging end and rotates the rotatable member. The pushing member pushes the activation bar and the torque is displayed on the gauge. The spring assists the rod back to its original position.

3 Claims, 5 Drawing Sheets

TORQUE TEST DEVICE

FIELD OF THE INVENTION

The present invention relates to a compact torque test device which includes a rotatable member engaged with an activation bar extending from a gauge and a spring biased to a rod extending from the rotatable member for positioning the rotatable member when the test is over.

BACKGROUND OF THE INVENTION

Wrenches or ratchet tools are required to be able to output a large torque which decides how easily to loosen a nut or to tighten a nut. The feature of the torque that can be used is an important character for the tools. Generally, the tools are tested by a torque test device in the manufacturer's factory and the test reports are provided to the customers for conference. Nevertheless, the reports are criticized for the competitors and cannot provide an impressed and substantial impression for the buyers. Although there are some promotional sites equipped with the test devices which are heavy and bulky so that they are not easily to be moved and carried.

The present invention intends to provide a torque test device for testing torque of hand tools and has a simple structure and can be easily assembled and carried.

SUMMARY OF THE INVENTION

In accordance with one aspect of the present invention, there is provided a torque test device which comprises a body having a rotatable member received therein and an engaging end extends from an end of the rotatable member for being engaged with a wrench. The engaging end extends through a first hole in the body. A rod and a pushing member respectively extend from a periphery of the rotatable member. A gauge is located on a top of the body and an activation bar extending from the gauge 41 inserts into the body via a second hole of the body. A spring has an end contacting an inside of the body and the other end of the spring contacts the rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
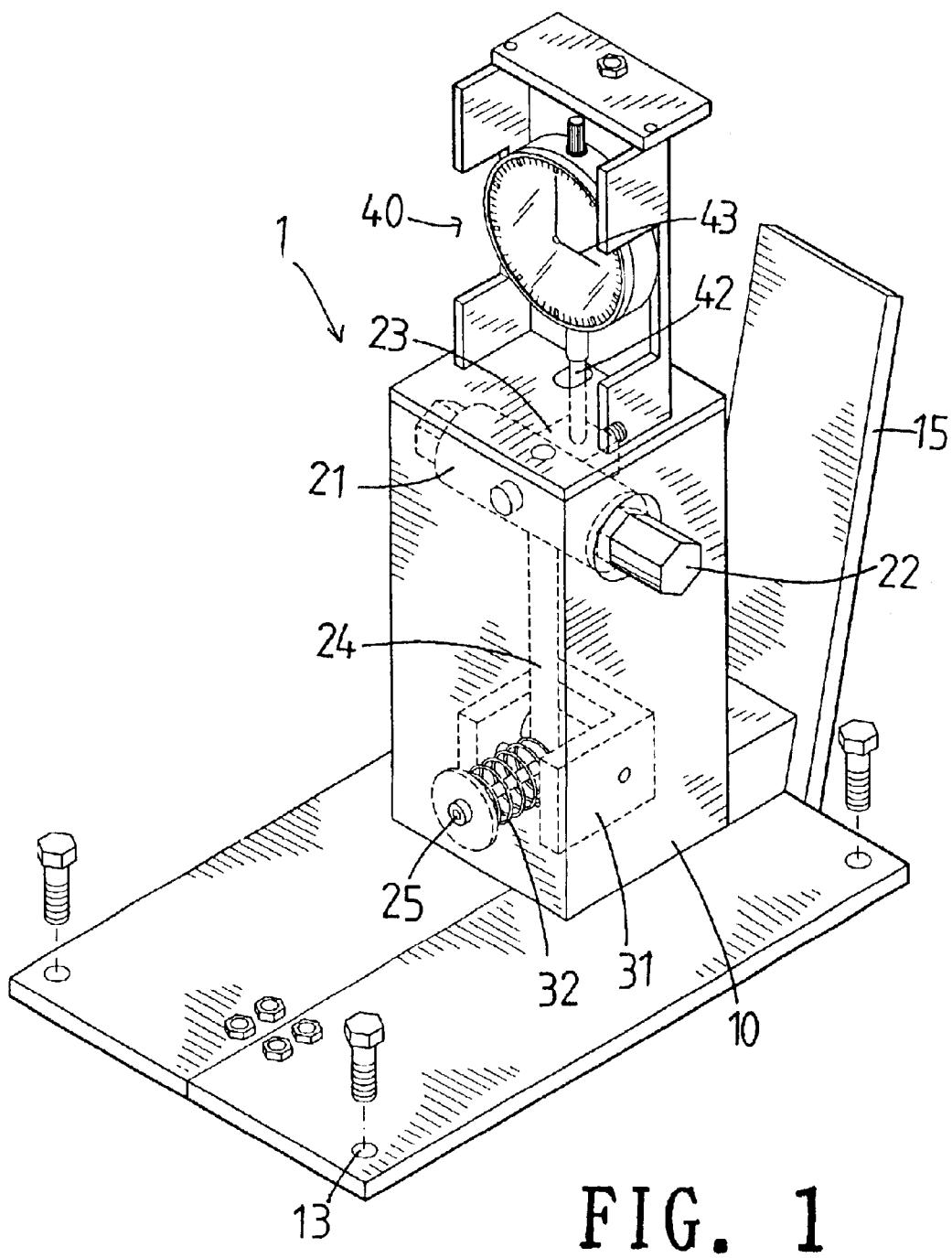
FIG. 1 is a perspective view to show the test device of the present invention.
Figure 2:
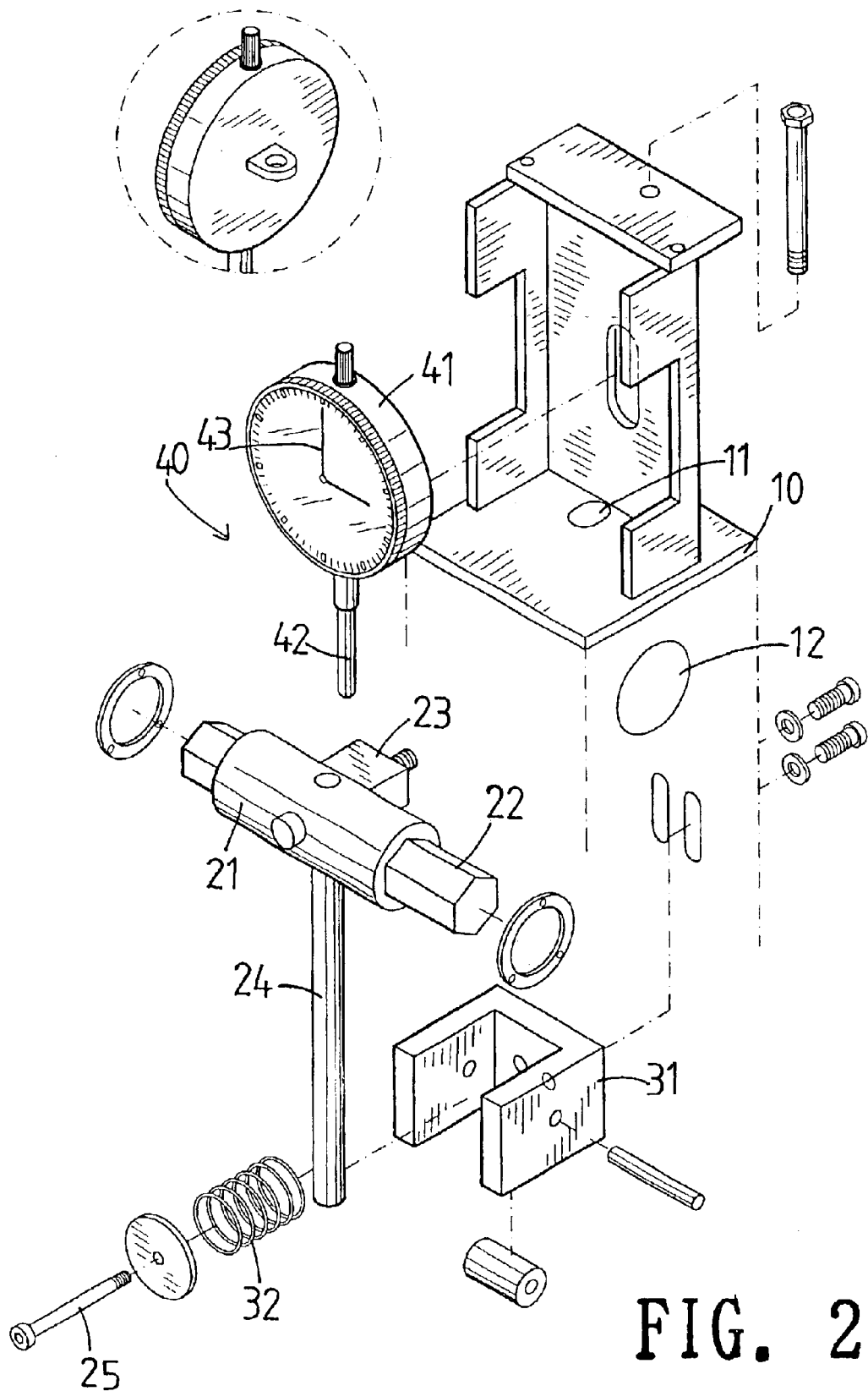
FIG. 2 is an exploded view to show the test device of the present invention.
Figure 3:
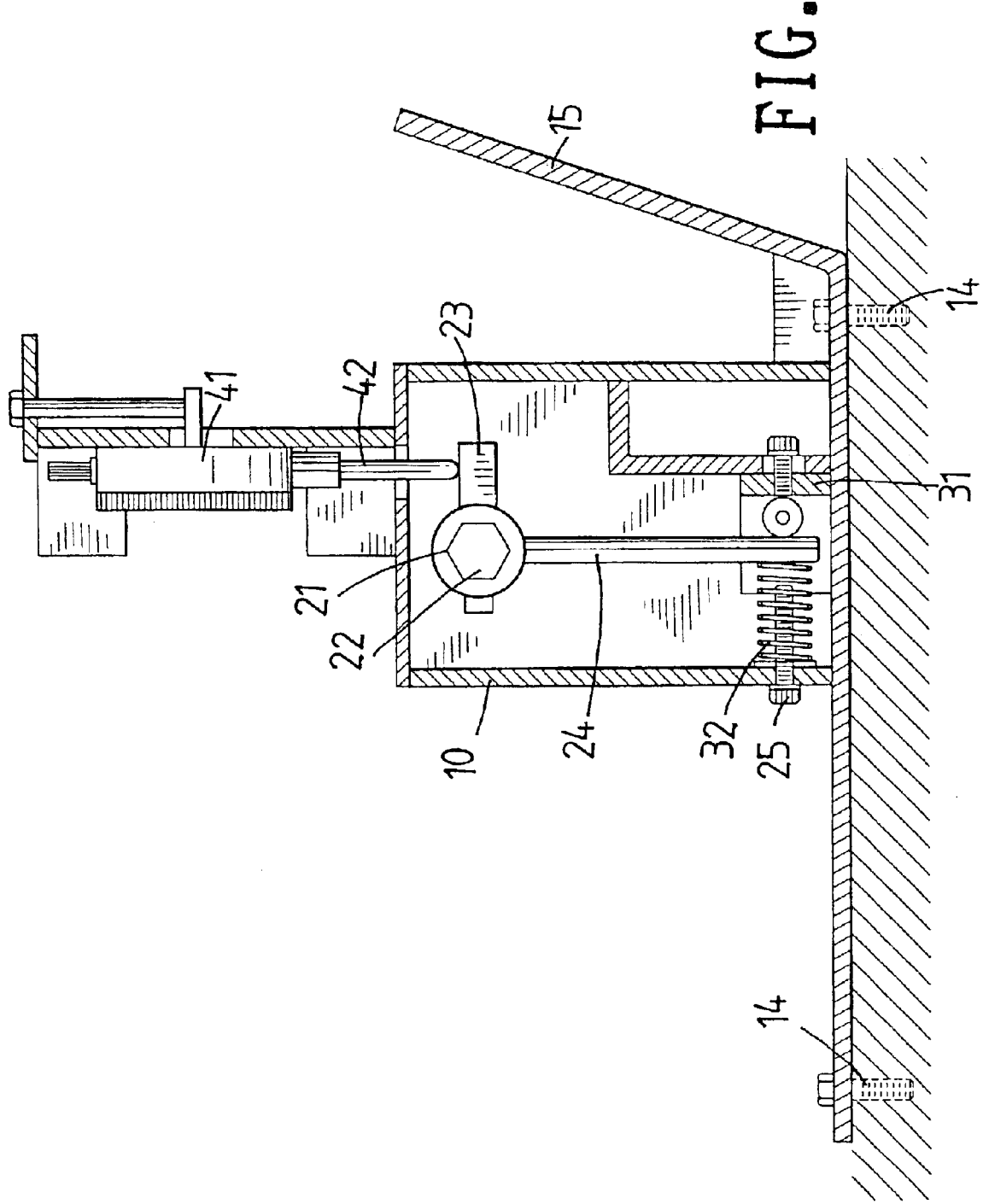
FIG. 3 is a cross sectional view to show the test device of the present invention.
Figure 5:
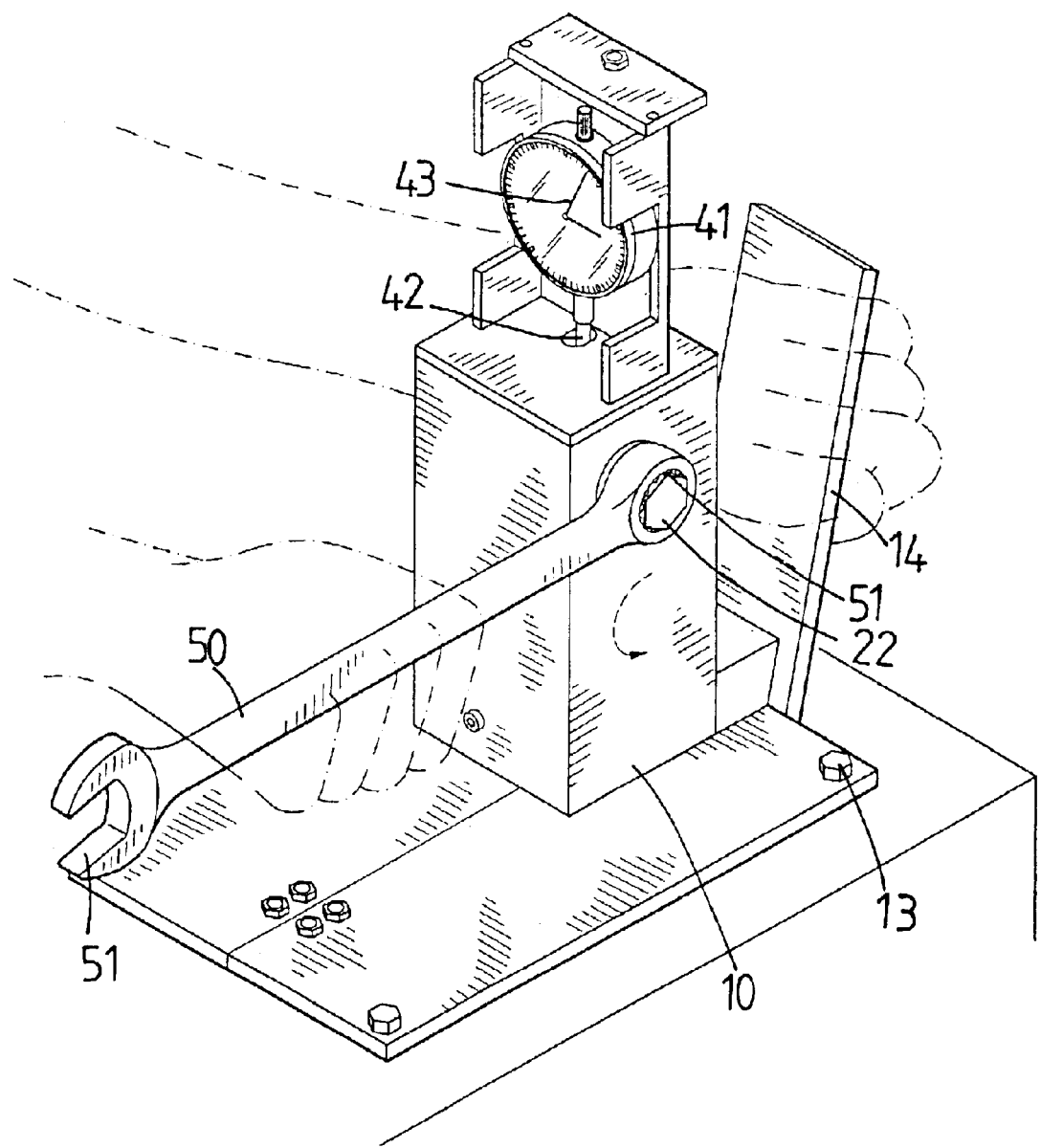
FIG. 5 is a perspective view to show the test device of the present invention is cooperated with a wrench.

Referring to FIGS. 1 to 3, the torque test device 1 of the present invention comprises a box-like body 10 which has a rotatable member 21 received therein and an engaging end 22 extends from an end of the rotatable member 21. A first hole 12 defined through a side wall of the body 10 and a second hole 11 defined through a top of the body 10. The engaging end 22 extends through the first hole 12 so that a wrench 50 as shown in FIG. 5 is engaged with the engaging end 22. A rod 24 and a pushing member 23 respectively extend from a periphery of the rotatable member 21.

A display device 40 is connected on the top of the body 10 and includes a gauge 41 from which an activation bar 42 extends. The activation bar 42 is retractable and connected to a mechanism (not shown) in the gauge 41 so as to rotate the arms 43 of the gauge 41. The activation bar 42 is inserted into the body 10 via the second hole 11 of the body 10 and contacts the pushing member 23.

A spring 32 has an end contacting an inside of the body 10 and the other end of the spring 32 contacts the rod 24. A pin 25 extends through a front wall of the body 10 and is mounted by the spring 32 which is then positioned without being shifted. A limitation frame 31 is located in the body 10 and includes a close end such that the rod 24 is located between the close end of the limitation frame 31 and the spring 32. A board that is fixed on a surface by extending screws through holes 13 in the board and a holding member 15 extends from the board and is located at an other side of the body 10.

Figure 4:
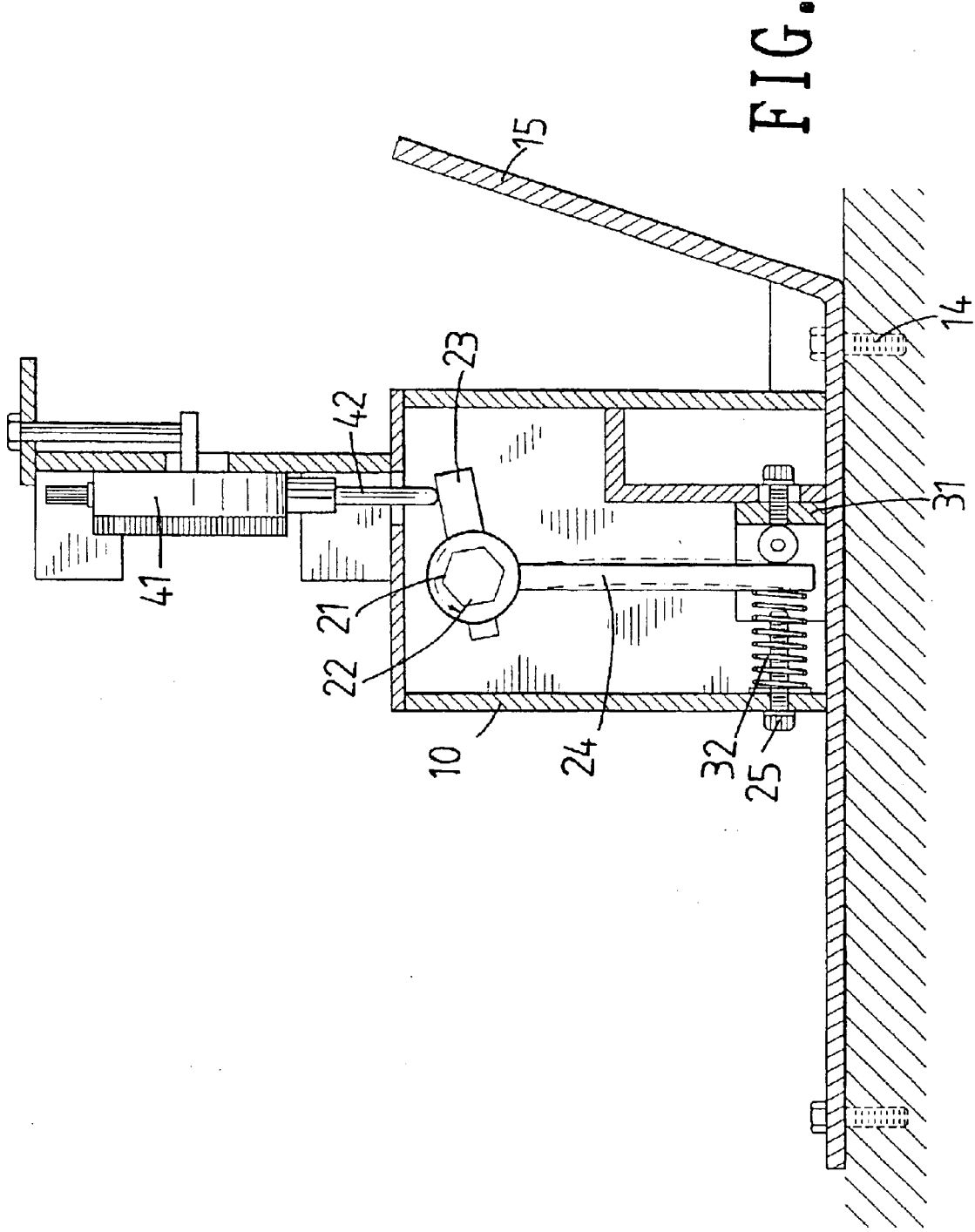
FIG. 4 is a cross sectional view to show that the test device of the present invention is cooperated with a wrench.

Referring to FIGS. 4 and 5, when rotating the wrench 50, the rotatable member 21 is rotated an angle so that the pushing member 23 pushes the activation bar 42 so that the arm 43 shows the value on the dial of the gauge 41. The user may hold the wrench 50 by one hand and the other hand holds the holding member 15 so as to easily apply a torque to the wrench 50. After the value of the torque is read, the wrench 50 is released, the rod 24 is stopped by the spring 32 and can be back to the original position.

The test device has a simple structure and can be easily assembled and carried so that it is convenient to be move and carried.

While we have shown and described the embodiment in accordance with the present invention, it should be clear to those skilled in the art that further embodiments may be made without departing from the scope of the present invention.

What is claimed is:

1. A torque test device comprising:
   a body having a rotatable member received therein and an engaging end extending from an end of the rotatable member, a first hole defined through a side wall of the body and a second hole defined through a top of the body, the engaging end extending through the first hole, a rod and a pushing member respectively extending from a periphery of the rotatable member;
   a gauge located on a top of the body and an activation bar extending from the gauge and inserted into the body via the second hole of the body and contacting the pushing member, and
   a spring having an end contacting an inside of the body and the other end of the spring contacting the rod.

2. The device as claimed in claim 1 further comprising a limitation frame which is located in the body and including a close end such that the rod is located between the close end of the limitation frame and the spring.

3. The device as claimed in claim 1 further comprising a board adapted to be fixed on a surface and a holding member extending from the board and located at another side of the body.

* * * * *